US012559149B2

(12) United States Patent
Xue et al.

(10) Patent No.: US 12,559,149 B2
(45) Date of Patent: Feb. 24, 2026

(54) FOLDABLE CART AND FOLDABLE CART FRAME

(71) Applicant: ShelterLogic Corp., Watertown, CT (US)

(72) Inventors: Ning Xue, Newtown, CT (US); Jeffrey Clayton Simonson, Austin, TX (US)

(73) Assignee: ShelterLogic Corp., Watertown, CT (US)

( * ) Notice: Subject to any disclaimer, the term of this patent is extended or adjusted under 35 U.S.C. 154(b) by 214 days.

(21) Appl. No.: 18/382,304

(22) Filed: Oct. 20, 2023

(65) Prior Publication Data

US 2024/0132127 A1     Apr. 25, 2024
US 2024/0227890 A9     Jul. 11, 2024

Related U.S. Application Data

(60) Provisional application No. 63/418,867, filed on Oct. 24, 2022.

(51) Int. Cl.
B62B 1/12             (2006.01)

(52) U.S. Cl.
CPC ..................................... B62B 1/12 (2013.01)

(58) Field of Classification Search
CPC .. B62B 1/12; B62B 1/04; B62B 1/042; B62B 1/045; B62B 3/027; B62B 3/106; B62B 5/067
See application file for complete search history.

(56) References Cited

U.S. PATENT DOCUMENTS 7,281,731 B2 * 10/2007 Shamah .................... B62B 1/12
                                           280/654
10,737,712 B2 * 8/2020 Garrison ................. B62B 7/068
(Continued)

*Primary Examiner* — John D Walters

(74) *Attorney, Agent, or Firm* — Carmody Torrance Sandak & Hennessey LLP

(57) ABSTRACT

A foldable cart frame including a first rod having a first end and a second end; a second rod having a first end and a second end; a third rod having a first end and a second end, wherein the first end of the third rod is rotatably coupled to the first end of the second rod; a fourth rod having a first end and a second end, wherein the first end of the fourth rod is rotatably coupled to the second end of the second rod; a first coupler for receiving and securing therein the second end of the third rod; a second coupler for receiving and securing therein the second end of the fourth rod; a fifth rod having a first end and a second end, wherein the first end of the fifth rod is rotatably coupled to the first end of the first rod; a sixth rod having a first end and a second end, wherein the first end of the sixth rod is rotatably coupled to the second end of the first rod; wherein the fifth rod extends through the first coupler, and wherein the fifth rod is rotatable within the first coupler; wherein the sixth rod extends through the second coupler, and wherein the sixth rod is rotatable within the second coupler; a seventh rod having a first end and a second end, wherein the first end of the seventh rod is received and secured in the first coupler; an eighth rod having a first end and a second end, wherein the first end of the eighth rod is received and secured in the second coupler; and whereby a flexible container is supportable by at least the second ends of the respective fifth, sixth, seventh, and eighth rods. A foldable cart that includes the foldable cart frame and a flexible container is also disclosed.

19 Claims, 11 Drawing Sheets

(56) References Cited

U.S. PATENT DOCUMENTS

D1,048,636  S   *  10/2024  Bai ................................ D34/12
12,134,418  B2 *  11/2024  Petrovich .............. B62B 3/1444

* cited by examiner 50,55

A,B

A,B 60,65

140

142

120

FOLDABLE CART AND FOLDABLE CART FRAME

BACKGROUND OF THE INVENTION

The present invention relates generally to portable carts, such as carts for the beach, groceries, or general outdoor activities as examples and not limitation, and more particularly, to an improved foldable cart and foldable cart frame, preferably for outdoor use, such as at the beach by way of example and not limitation.

Folding carts, for the beach or otherwise, are well known in the art. Designers and inventors have for years been trying to design and construct outdoor (e.g. beach) carts that achieve a plurality of functional, aesthetic, packaging, stability, sturdiness, and robustness objectives while remaining within desirable manufacturing cost constraints. Examples of prior art folding carts can be found in U.S. Pat. No. 5,265,892 and D860,572 just to name a few. However, it is believed that an optimal foldable cart and corresponding foldable cart frame has eluded these past designers and inventors.

It is therefore desirable to provide a foldable cart and corresponding foldable cart frame that overcomes the deficiencies in the prior art, not the least of which is to provide a foldable cart and corresponding foldable cart frame that is easy to set up/expand for use, collapse for storage/transport, package for sale and transport, and that achieves all of the aforementioned and below mentioned objectives. It is believed that the present invention achieves the foregoing objectives as well as others as will be disclosed herein.

SUMMARY AND OBJECTIVES OF THE INVENTION

It is thus an objective of the present invention to overcome the perceived deficiencies in the prior art.

Specifically, it is an objective of the present invention to provide a foldable cart and corresponding foldable cart frame that is easy to set up/expand for use, collapse for storage/transport, and package for sale and transport.

It is a further objective of the present invention to provide a foldable cart and corresponding foldable cart frame that improves upon the prior art as to functionality, aesthetics, packaging, stability, sturdiness, and robustness, while also remaining within desirable manufacturing cost constraints.

It is believed that the present invention achieves the foregoing objectives for a foldable cart and corresponding foldable cart frame that is preferably for the outdoors and more preferably, but not exclusively, for the beach.

Other objectives and advantages of the present invention will become more apparent from a consideration of the drawings and ensuing disclosure.

To overcome the perceived deficiencies in the prior art and to achieve the objectives and advantages as set forth herein, the present invention is, generally speaking, directed to a foldable cart and a foldable cart frame.

In a first preferred embodiment, the invention is directed to a foldable cart frame comprising a first rod having a first end and a second end; a second rod having a first end and a second end; a third rod having a first end and a second end, wherein the first end of the third rod is rotatably coupled to the first end of the second rod; a fourth rod having a first end and a second end, wherein the first end of the fourth rod is rotatably coupled to the second end of the second rod; a first coupler for receiving and securing therein the second end of the third rod; a second coupler for receiving and securing therein the second end of the fourth rod; a fifth rod having a first end and a second end, wherein the first end of the fifth rod is rotatably coupled to the first end of the first rod; a sixth rod having a first end and a second end, wherein the first end of the sixth rod is rotatably coupled to the second end of the first rod; wherein the fifth rod extends through the first coupler, and wherein the fifth rod is rotatable within the first coupler; wherein the sixth rod extends through the second coupler, and wherein the sixth rod is rotatable within the second coupler; a seventh rod having a first end and a second end, wherein the first end of the seventh rod is received and secured in the first coupler; an eighth rod having a first end and a second end, wherein the first end of the eighth rod is received and secured in the second coupler; and whereby a flexible container is supportable by at least the second ends of the respective fifth, sixth, seventh, and eighth rods.

In another preferred embodiment, the present invention is directed to a foldable cart comprising a foldable cart frame such as the foldable cart frame disclosed above in combination with a flexible container.

Wheels are also preferably provided and may be coupled to the respective first and second ends of the first rod 25 or in an alternative embodiment, the wheels may be coupled to the respective first and second ends of the second rod.

In yet another preferred embodiment, the present invention is directed to a method of expanding a foldable cart frame such as the foldable cart frame disclosed above, wherein the method comprises the steps of rotating the third rod and the second rod away from each other and rotating the fifth rod and the first rod away from each other; rotating the fourth rod and the second rod away from each other and rotating the sixth rod and the first rod away from each other; and rotating the third rod away and the fifth rod away from each other and rotating the fourth rod and the sixth rod away from each other.

In yet another preferred embodiment, the present invention is directed to a method of folding a foldable cart frame such as the foldable cart frame disclosed above, wherein the method comprises the steps of rotating the third rod and the fifth rod towards each other and rotating the fourth rod and the sixth rod towards each other; rotating the third rod and the second rod towards each other and rotating the fifth rod and the first rod towards each other; and rotating the fourth rod and the second rod towards each other and rotating the sixth rod and the first rod towards each other.

Any combination or permutation of features, functions and/or embodiments as disclosed herein is envisioned. Additional advantageous features, functions and applications of the disclosed assemblies and methods of the present invention will be apparent from the disclosure that follows, particularly when read in conjunction with the appended figures.

The invention accordingly comprises the features, combinations of elements and features, arrangement of parts and methods for using the same which will be exemplified in the description and illustrations hereinafter set forth, and the scope of the invention will be indicated in the claims.

BRIEF DESCRIPTION OF THE DRAWINGS

The above set forth and other features of the present invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

Reference is made to the Figures in connection with the following disclosure for an understanding of preferred embodiments of the present invention.

Generally speaking, the present invention is directed a foldable cart, generally indicated at 10, constructed in accordance with preferred embodiments of the present invention. Foldable cart 10 is preferably but not necessarily used for outdoor activities, such as but not limited to, transporting items to/from a beach, a park, a car or other means of transportation. As such, the portability and foldability of the cart and the components thereof, while still being adequately and sufficiently functional, aesthetically pleasing, and stable, sturdy and robust during use, are critical features and objectives of the present invention.

Based thereon, reference will now be made with specificity to a foldable cart frame, generally indicated at 20, constructed in accordance with the preferred embodiments of the present invention. As it will be seen, foldable cart 10 is generally comprised of foldable cart frame 20 and a foldable container, which is generally indicated at 100 and will also be disclosed in greater detail below.

Figure 4:
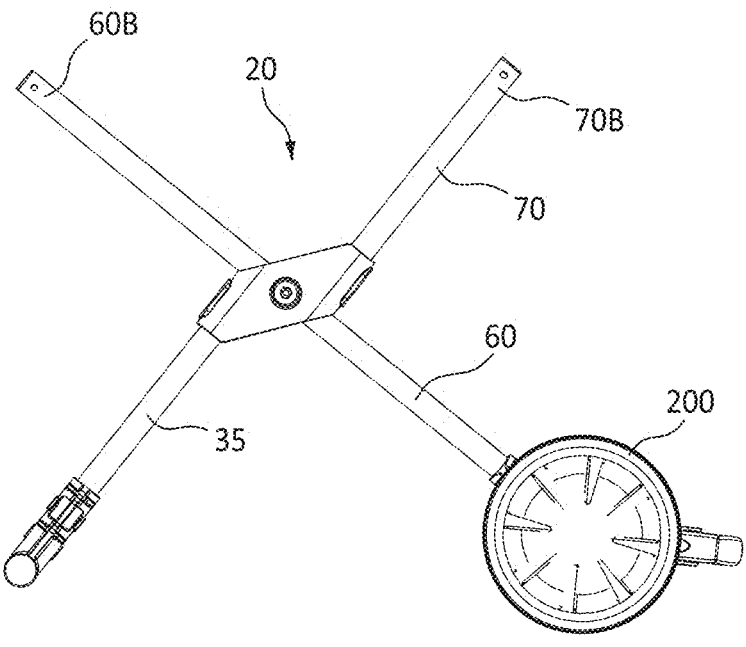
FIG. 4 is a side view of the foldable cart frame as illustrated in FIG. 3.

In a first preferred embodiment, foldable cart frame 20 comprises a first rod 25 having a first end 25A to which a first wheel 200 is coupled and a second end 25B to which a second wheel 210 is coupled; a second rod 30 having a first end 30A and a second end 30B; a third rod 35 having a first end 35A and a second end 35B, wherein the first end 35A of the third rod 35 is rotatably coupled to the first end 30A of the second rod; a fourth rod 40 having a first end 40A and a second end 40B, wherein the first end 40A of the fourth rod 40 is rotatably coupled to the second end 30B of the second rod 30; a first coupler, generally indicated at 50, for receiving and securing therein the second end 35B of the third rod 35; a second coupler, generally indicated at 55, for receiving and securing therein the second end 40B of the fourth rod 40; a fifth rod 60 having a first end 60A and a second end 60B, wherein the first end 60A of the fifth rod 60 is rotatably coupled to the first end 25A of the first rod 25; a sixth rod 65 rod having a first end 65A and a second end 65B, wherein the first end of the sixth rod 65 is rotatably coupled to the second end 25B of the first rod. As should be clear from at least FIGS. 4 and 5, which will be discussed in greater detail below, fifth rod 60 extends through the first coupler 50, and this fifth rod 50 is also rotatable within the first coupler 50 as will be disclosed in greater detail below. With both couplers 50, 55 being preferably made similar if not identical and the other side of the cart frame 20 being a mirror image of FIG. 4, it shall be well understood that in the preferred embodiments, sixth rod 65 extends through the second coupler 55, and wherein the sixth rod 65 is rotatable within the second coupler 55. Foldable cart frame 10 also comprises a seventh rod 70 having a first end 70A and a second end 70B, wherein the first end 70A of the seventh rod 70 is received and secured in the first coupler 50; and an eighth rod 75 having a first end 75A and a second end 75B, wherein the first end 75A of the eighth rod 75 is received and secured in the second coupler 55.

Figure 3:
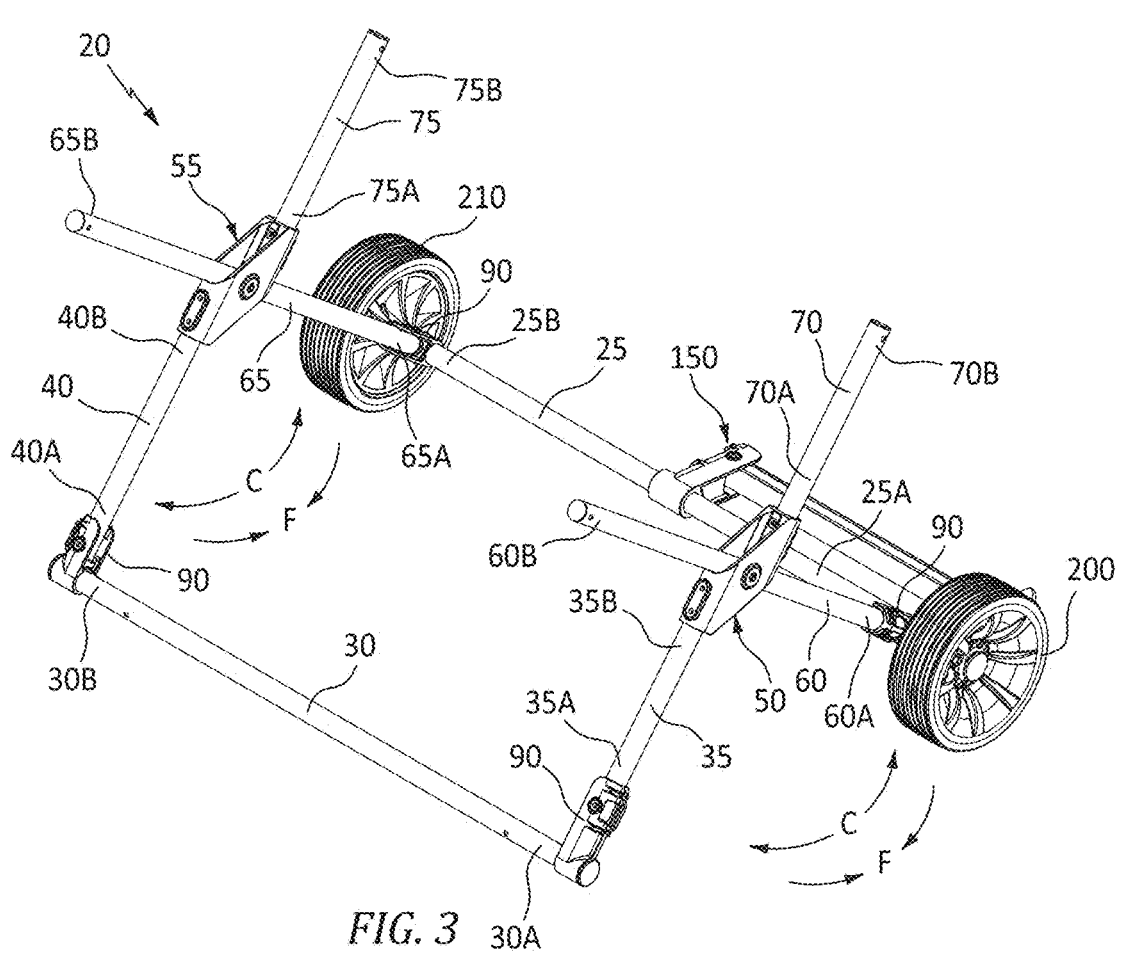
FIG. 3 is a perspective view of the foldable cart frame of the foldable cart of FIGS. 1 and 2.
Figure 3A:
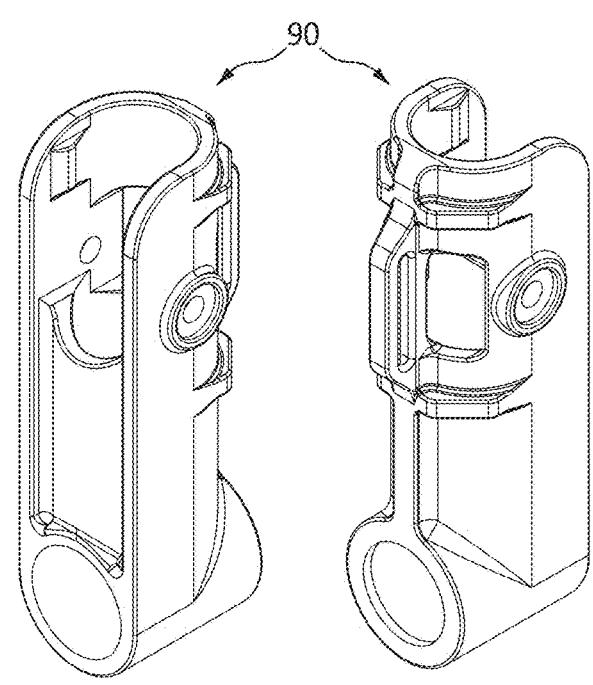
FIG. 3A illustrates the front and back of a component constructed in accordance with preferred embodiments of the present invention.

FIG. 3A illustrates close up views of exemplary connectors 90 that are used to rotatably couple the respective rods as illustrated in the figures and discussed above and below.

As will be explained in greater detail below, it should be understood that flexible container 100 is supportable by at least the second ends 60B, 65B, 70B, and 75B of the respective fifth, sixth, seventh and eighth rods 60, 65, 70, 75.

Figures 2, 2A, 2B:
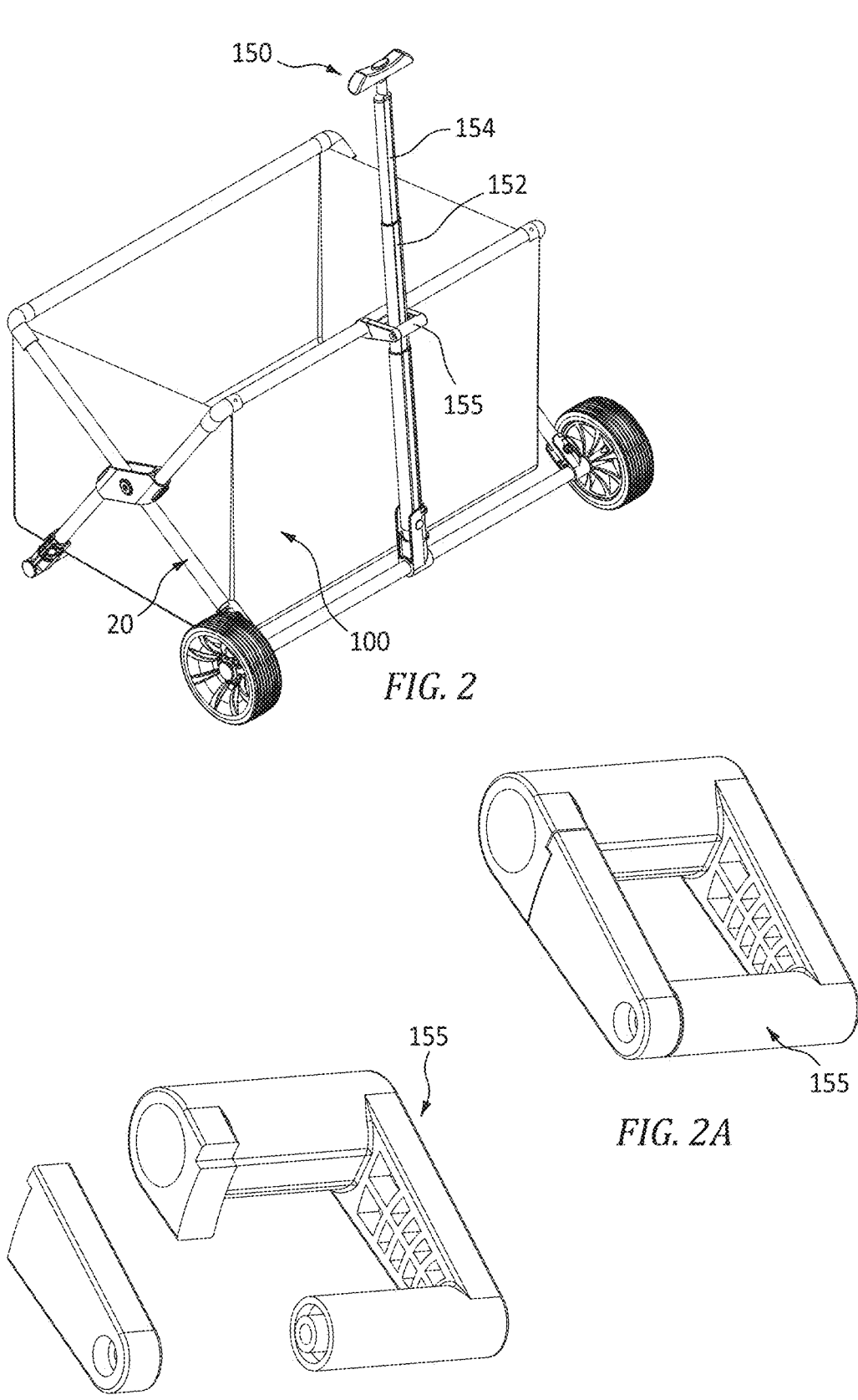
FIGS. 2A and 2B illustrate a component constructed in accordance with preferred embodiments of the present invention.

Foldable cart frame 10 also preferably comprises an extendable handle assembly, generally indicated at 150, rotatably coupled to first rod 25. Preferably, the extendable handle assembly 150 comprises a telescoping handle comprised of at least two members 152, 154 (see FIG. 2).

Figure 5:
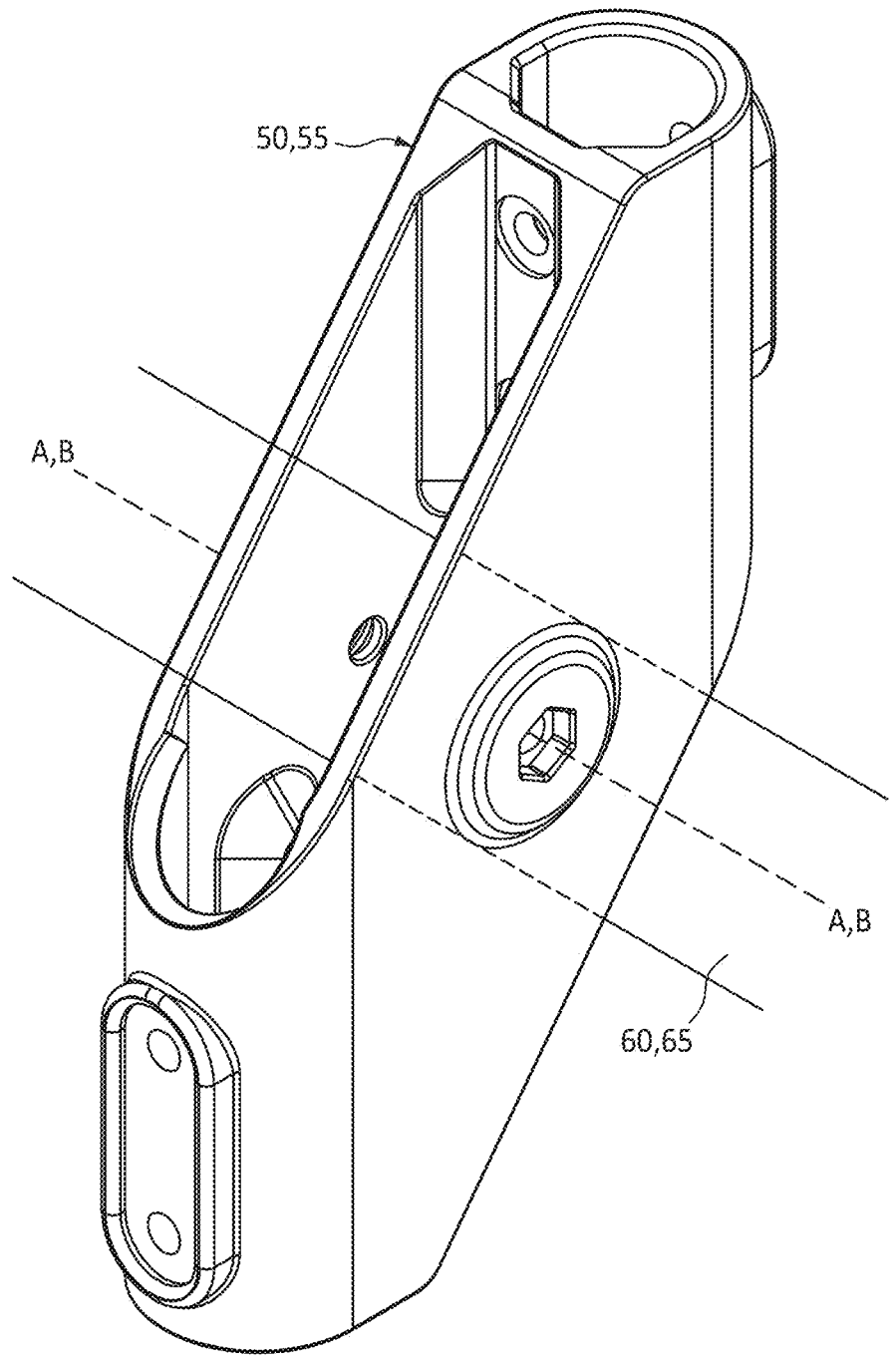
FIG. 5 is a perspective view of a coupler constructed in accordance with the present invention.

Reference is now also made to FIG. 5, which illustrates preferred coupler constructions for couplers 50, 55, which are preferably constructed identically. As disclosed above, fifth rod 60 extends through first coupler 50 and sixth rod 65 extends through second coupler 55. FIG. 5 particularly highlights the construction wherein fifth rod 60 rotates about an axis "A" within the first coupler 50 and the sixth rod 65 rotates about an axis "B" within the second coupler 55. Again, with first and second couplers 50 and 55 preferably being constructed identically, FIG. 5 is intended to illustrate both couplers 50 and 55 with the one figure. The couplers 50, 55 will include means about which the fifth rod 60 rotates within the first coupler 50 and means about which the sixth rod 65 rotates within the second coupler 55. Preferably, the means about which the respective rods 60, 65 rotate may be one or more of the following, a bolt(s), a pin(s), a screw(s), a dowel(s), or any extending member that also preferably includes a securing and/or tightening member or structure to secure the respective bolt(s), pin(s), screw(s), and/or dowel(s) to and/or within the couplers as illustrated in FIG. 5.

The foregoing discloses features and construction of a foldable cart frame 20 that is a component of the preferred embodiments of the foldable cart 10. Completing the construction of the foldable cart 10 is the inclusion of flexible container 100. In connection with the disclosure of a preferred flexible container 100, reference may also be had to FIGS. 6-9.

In a preferred embodiment, flexible container 100 comprises a first frame member 105 along a first top side of the flexible container 100 and a second frame member 110 along a second top side of the flexible container 100. As can be seen with additional reference to FIGS. 1, 2, and 3, the first frame member 105 has a first end 105A that is coupled to the second end 60B of the fifth rod 60; the first frame member 105 has a second end 105B that is coupled to the second end 65B of the sixth rod 65; the second frame member 110 has a first end 110A that is coupled to the second end 70B of the seventh rod 70; and the second frame member 110 has a second end 110B that is coupled to the second end 75B of the eighth rod 75. In this way, it can be seen that flexible container 100 is supported by at least the second ends 60B, 65B, 70B, 75B of the respective fifth, sixth, seventh, and eighth rods 60, 65, 70, 75.

Preferably, to achieve the foregoing, the foldable cart 10 comprises a first connector 62 for coupling the first end 105A of the first frame member 105 to the second end 60B of the fifth rod 60; a second connector 67 for coupling the second end 105B of the first frame member 105 to the second end 65B of the sixth rod 65; a third connector 72 for coupling the first end 110A of the second frame member 110 to the second end 70B of the seventh rod 70; and a fourth connector 77 for coupling the second end 110B of the second frame member 110 to the second end 75B of the eighth rod 75.

Figure 1:
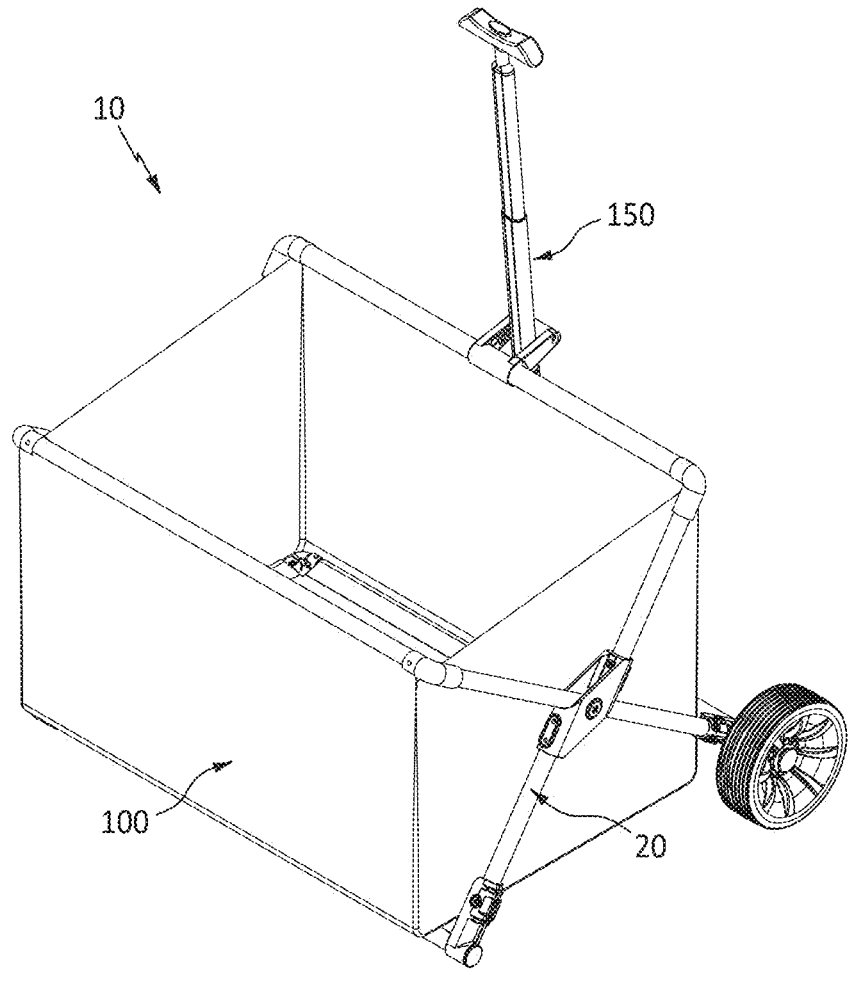
FIGS. 1 and 2 are perspective views of a foldable cart constructed in accordance with preferred embodiments of the present invention.

It is also envisioned that flexible container 100 may also rest on and/or be supported by rod 30 when flexible container 100 is mounted on cart frame 20 as illustrated in FIG. 1.

Figure 6:
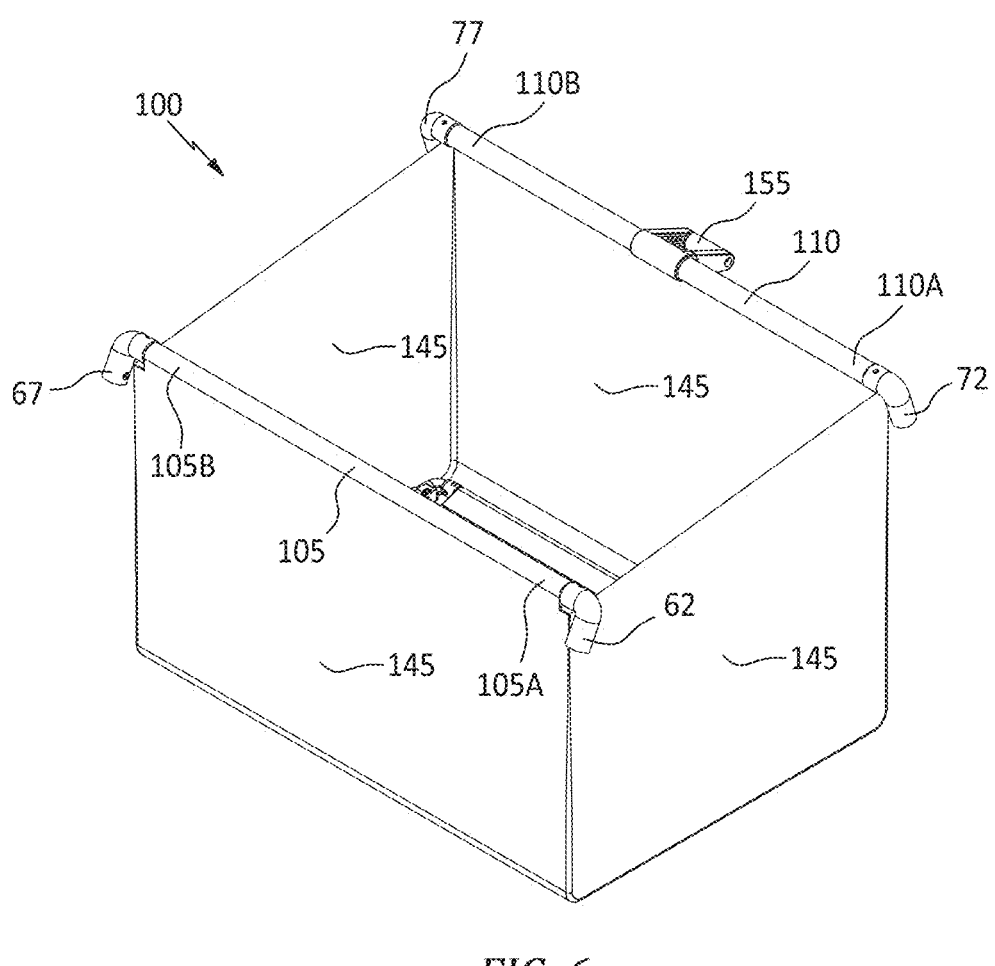
FIG. 6 is a perspective view of a flexible container constructed in accordance with preferred embodiments of the present invention.
Figure 6A:
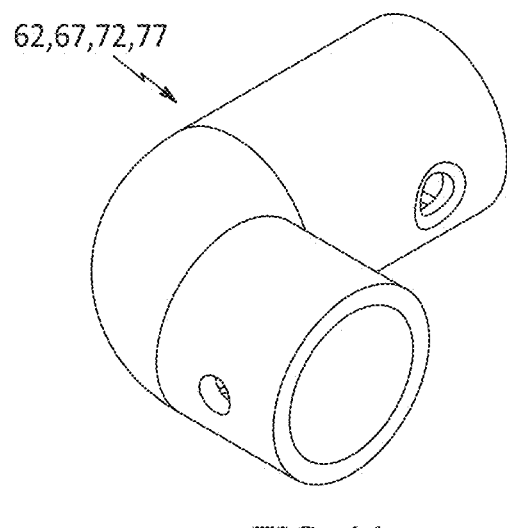
FIG. 6A illustrates a component constructed in accordance with preferred embodiments of the present invention.

FIG. 6A illustrates an exemplary connector that is intended to be used for connectors 62, 67, 72, and 77 that may be press-fit and/or further or otherwise secured to the ends of the corresponding ends of the first and second frame members 105, 110, and further where press-fitting and/or other securing means (e.g. screw, bolt, dowel, pin, adhesive, or the like) may be used when the other end(s) of the connectors are respectively coupled to the second ends 60B, 65B, 70B, 75B of the respective fifth, sixth, seventh, and eighth rods 60, 65, 70, 75 again, by press-fitting and/or other means as desired or preferred.

Figure 7:
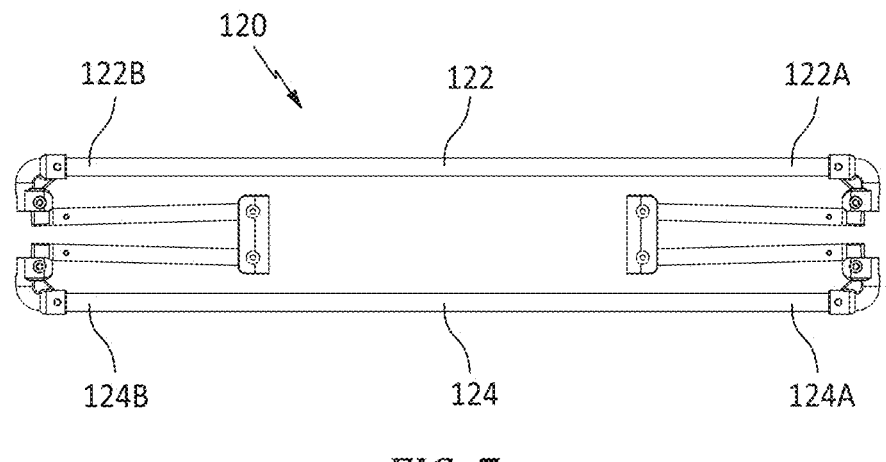
FIGS. 7 and 8 are views of component(s) of the flexible container constructed in accordance with preferred embodiments so the present invention.
Figure 8:
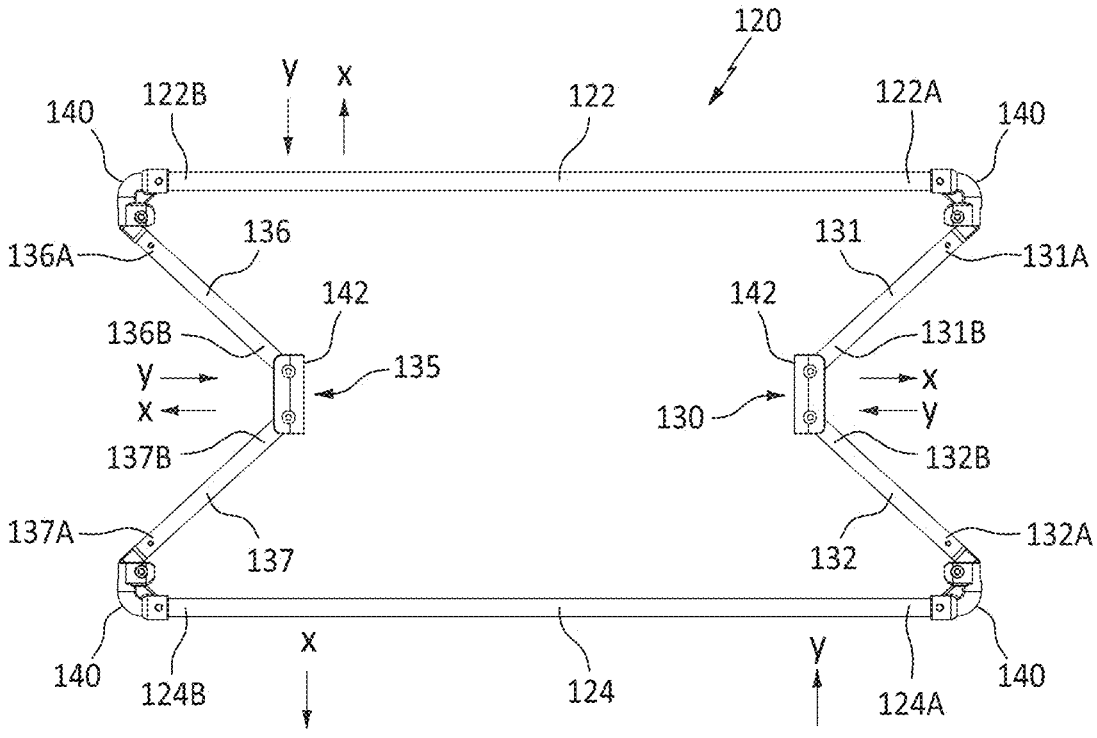
Figure 9:
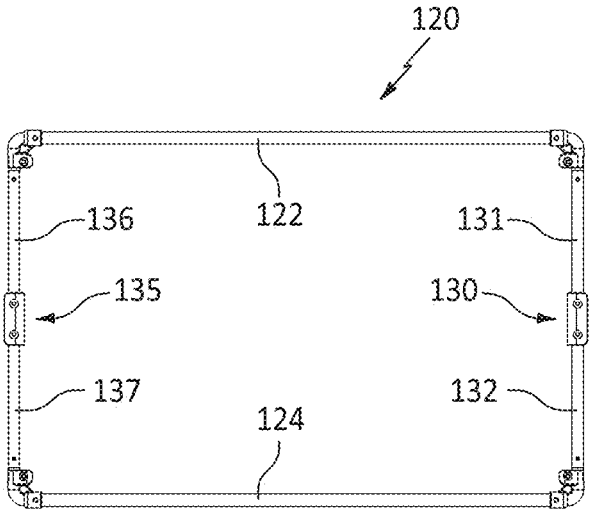
FIG. 9 illustrates the component(s) of the flexible container as illustrated in FIGS. 7 and 8 in an expanded condition in accordance with preferred embodiments of the present invention.

With reference to FIGS. 7-9, a preferred embodiment of the flexible container 100 includes an expandable base frame, generally indicated at 120, wherein the expandable base frame 120 preferably comprises a first base frame member 122 having a first end 122A and a second end 122B; a second base frame member 124 having a first end 124A and a second end 124B; a first coupling assembly generally indicated at 130 and a second coupling assembly generally indicated at 135.

In a preferred embodiment, the first coupling assembly 130 comprises a first arm 131 having a first end 131A and a second arm 132 having a first end 132A and a second end 132B; wherein the first end 131A of the first arm 131 is rotatably coupled to the first end 122A of the first base frame member 122; wherein the first end 132A of the second arm 132 is rotatably coupled to the first end 124A of the second base frame member 124; and wherein the second end 131B of the first arm 131 is rotatably coupled to the second end 132B of the second arm 132.

Also in a preferred embodiment the second coupling assembly 135 comprises a first arm 136 having a first end 136A and a second end 136B; a second arm 137 having a first end 137A and a second end 137B; wherein the first end 136A of the first arm 136 is rotatably coupled to the second end 122B of the first base frame member 122; wherein the first end 137A of the second arm 137 is rotatably coupled to the second end 124B of the second base frame member 124; and wherein the second end 136B of the first arm 136 is rotatably coupled to the second end 137B of the second arm 137.

Figure 7A:
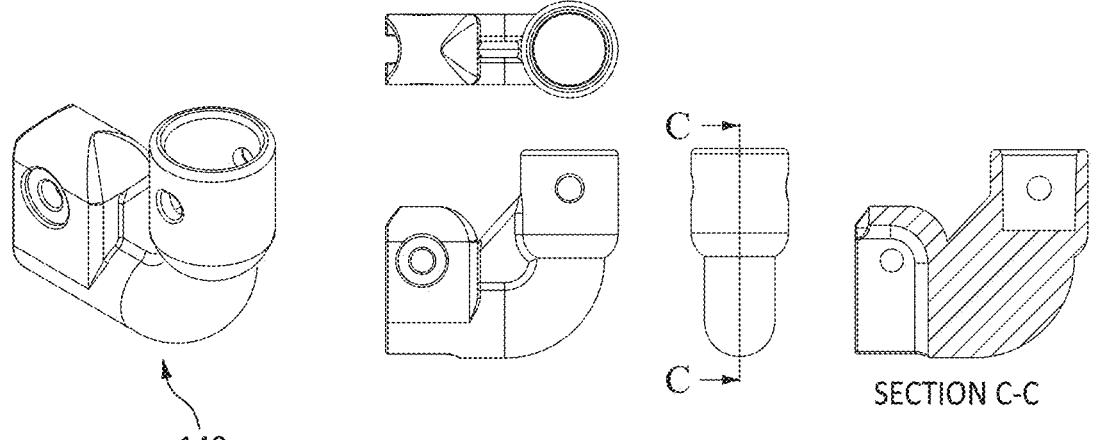
FIGS. 7A and 7B illustrate components constructed in accordance with preferred embodiments of the present invention.
Figure 7B:
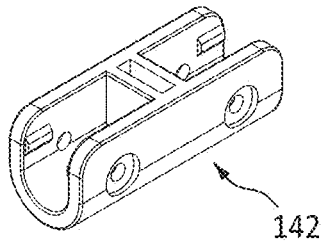

To achieve the aforementioned rotating, couplers 140 (e.g. see FIG. 7A, which illustrates different views/including a cross-sectional view, of a preferred coupler 140) can be provided at the corners of the expandable base frame 120 such that individual couplers 140 respectively couple (i) the first end 131A of the first arm 131 to the first end 122A of the first base frame member 122; (ii) the first end 132A of the second arm 132 to the first end 124A of the second base frame member 124; (iii) the first end 136A of the first arm 136 to the second end 122B of the first base frame member 122; and (iv) the first end 137A of the second arm 137 to the second end 124B of the second base frame member 124. Other couplers 142 (see FIG. 7B) are provided for respectively coupling and permitting rotation of (i) the second end 131B of the first arm 131 to the second end 132B of the second arm 132; and (ii) the second end 136B of the first arm 136 to the second end 137B of the second arm 137.

With the above disclosed construction, it can be seen that the expandable base frame 120 can be expanded (e.g. see FIG. 9) from a folded/collapsed configuration (e.g. see FIG. 7) or oppositely from an expanded configuration (e.g. see FIG. 9) to a folded/collapsed configuration (e.g. see FIG. 7). Preferably, this expansion or collapsing is achieved by movement of the couplers 140, 142 and members and arms of FIGS. 7 and 8 in the direction of arrows "X" for expansion or "Y" for collapsing of the expandable base frame 120 (e.g. showing an intermediate step of the collapsing or expansion in FIG. 8).

Flexible container 100 preferably comprises flexible side walls 145 and a flexible bottom thereby completing the construction of flexible container 100.

As indicated above, the foldable cart 100 further comprises extendable handle assembly 150 rotatably coupled to the first rod 25. Preferably, a retainer 155 (see also FIGS. 2A and 2B for a closed and exploded view of a preferred retainer 155 construction) is provided and coupled to the second frame member 110 of the flexible container 100 for retaining the telescoping handle of the extendable handle assembly.

Figure 10:
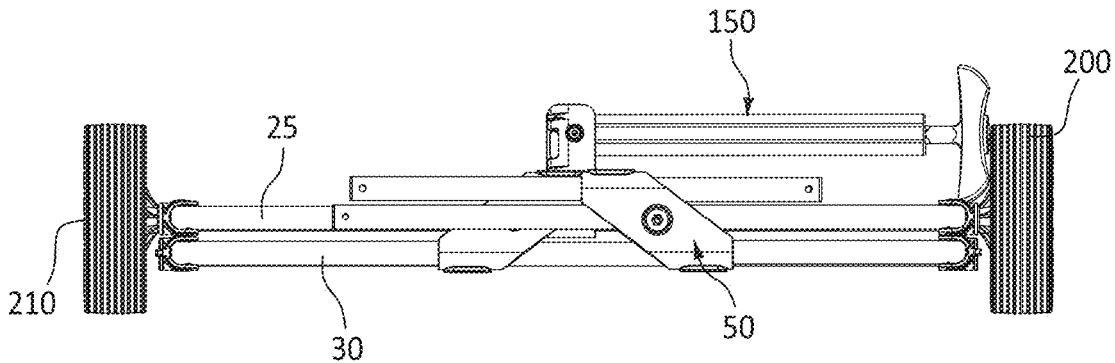
FIGS. 10-12 are perspective view of the foldable cart frame in varying degrees of expansion and collapsing to highlight preferred methodologies of the present invention.
Figure 11:
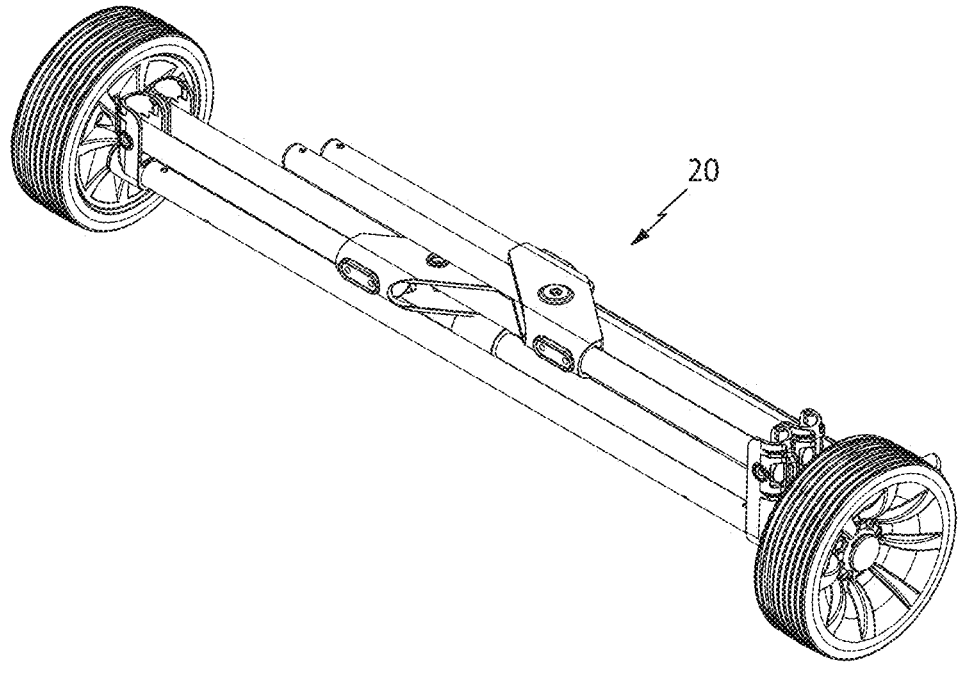
Figure 12:
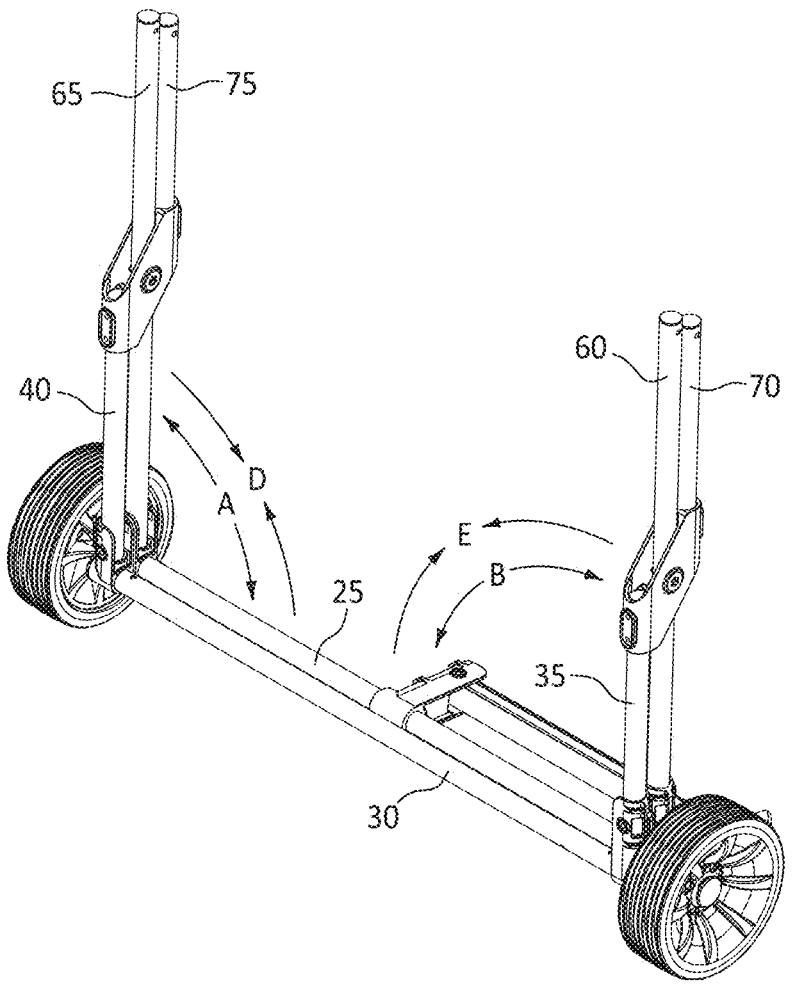

With at least a first preferred embodiment of the foldable cart fully constructed as set forth above, the present invention is also directed to a method of expanding (and/or collapsing) such a folded cart frame 20, wherein the folded cart frame 20 is constructed as set forth above. With reference also being made to FIGS. 10, 11, and 12, a preferred method of expanding such a folded cart frame preferably comprises the steps of (i) rotating the third rod 35 away from the second rod 30 (i.e. as indicated by arrows B in FIG. 12) and rotating the fifth rod 60 away from the first rod 25 (i.e. also as indicated by arrows B in FIG. 12); (ii) rotating the fourth rod 40 away from the second rod 30 (i.e. as indicated by arrows A in FIG. 12) and rotating the sixth rod 65 away from the first rod 25 (i.e. also as indicated by arrows A in FIG. 12); and rotating the third rod 35 away from the fifth rod 60 (i.e. as indicated by arrows C in FIG. 3) and rotating the fourth rod 40 away from the sixth rod 65 (i.e. also as indicated by arrows C in FIG. 3).

More broadly speaking but clearly incorporating and including the above methodology, a preferred method of expanding such a folded cart frame preferably comprises the steps of (i) rotating the third rod 35 and the second rod 30 away from each other and rotating the fifth rod 60 and the first rod 25 away from each other (i.e. all as indicated by arrows B in FIG. 12); (ii) rotating the fourth rod 40 and the second rod 30 away from each other and rotating the sixth rod 65 and the first rod 25 away from each other (i.e. all as indicated by arrows A in FIG. 12); and rotating the third rod 35 and the fifth rod 60 away from each other and rotating the fourth rod and the sixth rod 65 away from each other (i.e. all as indicated by arrows C in FIG. 12). That is, and should now clearly be understood, rotating one rod away from the other rod should be understood and interpreted to be a subset of the broader disclosed steps of rotating the specified rods away from each other.

In a corresponding manner, the present invention also provides for a method of folding or collapsing (such terms being used interchangeably and meant to indicate the same function as would be understood from this disclosure and the figures) the above-constructed foldable cart frame 20, wherein a preferred method comprises the steps of (i) rotating the third rod 35 towards the fifth rod 60 (i.e. as indicated by arrows F in FIG. 3) and rotating the fourth rod 40 towards the sixth rod 65 (i.e. as indicated by arrows F in FIG. 3); (ii) rotating the third rod 35 towards the second rod 30 (i.e. as indicated by arrows E in FIG. 12) and rotating the fifth rod 60 towards the first rod 25 (i.e. as indicated by arrows E in FIG. 12); and (iii) rotating the fourth rod 40 towards the second rod 30 (i.e. as indicated by arrows D in FIG. 12) and rotating the sixth rod 65 towards the first rod 25 (i.e. as indicated by arrows D in FIG. 12).

Here too, and more broadly speaking but clearly also incorporating and including the foregoing methodology, a preferred method of folding or collapsing the above-constructed foldable cart frame 20 comprises the steps of (i) rotating the third rod 35 and the fifth rod 60 towards each other and rotating the fourth rod 40 and the sixth rod 65 towards each other (i.e. all as indicated by arrows F in FIG. 3); (ii) rotating the third rod 35 and the second rod 30 towards each other and rotating the fifth rod 60 and the first rod 25 towards each other (i.e. all as indicated by arrows E in FIG. 12); and (iii) rotating the fourth rod 40 and the second rod 30 towards each other and rotating the sixth rod 65 and the first rod 25 towards each other (i.e. all as indicated by arrows D in FIG. 12). And likewise, rotating one rod towards the other rod should be understood and interpreted to be a subset of the broader disclosed steps of rotating the specified rods towards each other.

Importantly, the sequence of steps recited in the above disclosure, or the appended claims is not material to the invention, and therefore, the steps disclosed herein can be achieved and performed in differing order(s) while still remaining within the scope of the invention and the scope of the claims.

In the preferred embodiments, the rods are preferably metal and or preferably hollow steel tubing, but it should be understood that rods made out of other material(s), e.g. aluminum and/or plastic by way of example and not limitation, are also contemplated herein. The flexible material that comprises the flexile container is preferably made of fabric, plastic and/or other well-known flexible material suitable for the flexible containers of the type disclosed herein and desirable for the beach or other outdoor areas/venues.

As can now be seen by the disclosed embodiments, the present provides significant and numerous improvements and advantages over the prior art, which include and are not limited to improved functionality, aesthetics, packaging and transporting capabilities, as well as improved stability, sturdiness, and robustness of the cart itself and construction thereof. Other advantages also include improved and easier set up/expansion for use, collapsing for storage/transport, and packaging for sale and transport.

The features and aspects of embodiments are disclosed herein with reference to the accompanying drawings, in which elements are not necessarily depicted to scale, and in certain views, parts may have been exaggerated or removed for purposes of clarity. It is to be noted that the various features, steps and combinations of features/steps disclosed herein can be arranged and organized differently to result in embodiments which are still within the scope of the present invention.

Figure 4A:
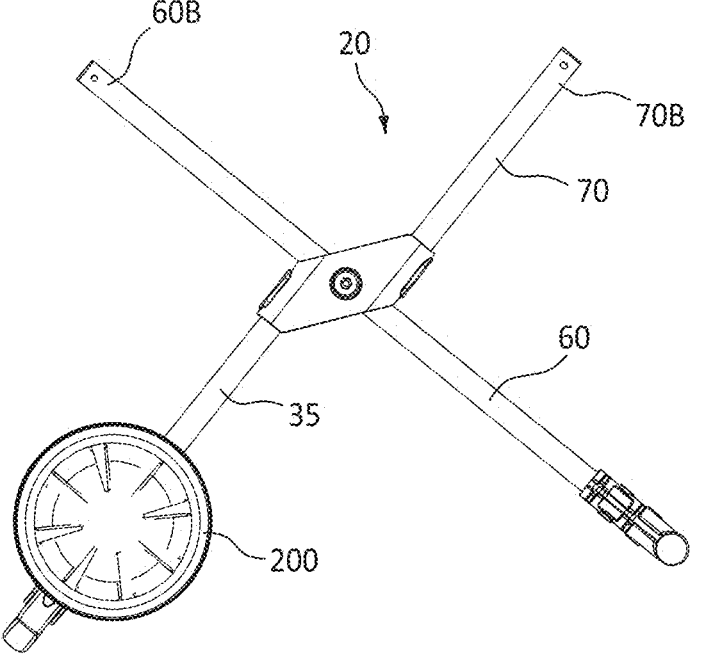
FIG. 4A is a side view of a foldable cart frame constructed in accordance with an alternative embodiment.

For example, in a first preferred embedment and as disclosed above, the first wheel 200 is coupled to the first end 25A of the first rod 25; and the second wheel 210 is coupled to the second end 25B of the first rod 25A. However, in an alternative embodiment and as illustrated in FIG. 4A, the first wheel 200 may be coupled to the first end 30A of the second rod 30; and the second wheel 210 may be coupled to the second end 30B of the second rod 30. Of course, in such an alternative embodiment the handle assembly 150 would be mounted to second bar 30 instead of first bar 25 as should be understood by those skilled in the art.

Also, references to "first end" and "second end" are intended to be for orientation purposes and the references in the figures to such ends are not to be taken literally, e.g. for example, the meaning and intent of "first end" and/or "second end" should be understood as the "general" ends of the members even though/if the reference lines in the figures may or may not be pointing to the exact end of the member so referenced and/or even coupling and/or connections are not taking place at the endmost tip of the structure.

For the avoidance of doubt, anything left and right, respectively, of the centerline of any member, structure, or rod disclosed herein should be considered and interpreted to mean within the respective "end(s)" of such member, structure, or rod disclosed herein, although in a more likely construction, within the last 20% of any member, structure, or rod disclosed herein is a more likely and preferred embodiment to be what the disclosed respective "end(s)" of such member, structure, or rod disclosed herein is/are more likely to be. In even a more specific embodiment, the respective ends of such member(s), structure(s), and/or rod(s) disclosed herein may be even closer to the actual respective ends than only the last 20% of the entire length of such member(s), structure(s), and/or rod(s), but to avoid overly narrowly interpreted claims, the entire forgoing should be used for interpreting the claims if needed.

As thus should now be understood by those skilled in the art, the present invention overcomes all of the aforementioned deficiencies while also providing the advantages mentioned herein as well as those advantages that should be understood by those skilled in the art.

Other advantages and objectives are deemed to be apparent from the disclosure herein. It should also be appreciated that the present invention can be implemented and utilized in numerous ways. While the present invention has been described with respect to preferred embodiments, those skilled in the art will readily appreciate that various changes and/or modifications can be made to the invention without departing from the spirit or scope of the invention.

What is claimed is:

1. A foldable cart frame comprising:

a first rod having a first end and a second end;

a second rod having a first end and a second end;

a third rod having a first end and a second end, wherein the first end of the third rod is rotatably coupled to the first end of the second rod;

a fourth rod having a first end and a second end, wherein the first end of the fourth rod is rotatably coupled to the second end of the second rod;

a first coupler for receiving and securing therein the second end of the third rod;

a second coupler for receiving and securing therein the second end of the fourth rod;

a fifth rod having a first end and a second end, wherein the first end of the fifth rod is rotatably coupled to the first end of the first rod;

a sixth rod having a first end and a second end, wherein the first end of the sixth rod is rotatably coupled to the second end of the first rod;

wherein the fifth rod extends through the first coupler, and wherein the fifth rod is rotatable within the first coupler;

wherein the sixth rod extends through the second coupler, and wherein the sixth rod is rotatable within the second coupler;

a seventh rod having a first end and a second end, wherein the first end of the seventh rod is received and secured in the first coupler;

an eighth rod having a first end and a second end, wherein the first end of the eighth rod is received and secured in the second coupler; and whereby a flexible container is supportable by at least the second ends of the respective fifth, sixth, seventh, and eighth rods.

2. The foldable cart frame as claimed in claim 1, further comprising an extendable handle assembly rotatably coupled to the first rod.

3. The foldable cart frame as claimed in claim 2, wherein the extendable handle assembly comprises a telescoping handle comprised of at least two members.

4. The foldable cart frame as claimed in claim 1, wherein the fifth rod rotates about an axis within the first coupler and the sixth rod rotates about an axis within the second coupler.

5. The foldable cart frame as claimed in claim 1, including means about which the fifth rod rotates within the first coupler and means about which the sixth rod rotates within the second coupler.

6. The foldable cart frame as claimed in claim 1, further comprising:

a first wheel coupled to the first end of the first rod; and
a second wheel coupled to the second end of the first rod.

7. A foldable cart, the foldable cart comprising:

the foldable cart frame as claimed in claim 1; and a flexible container, wherein the flexible container comprises a first frame member along a first top side of the flexible container and a second frame member along a second top side of the flexible container, and wherein:

the first frame member has a first end that is coupled to the second end of the fifth rod;

the first frame member has a second end that is coupled to the second end of the sixth rod;

the second frame member has a first end that is coupled to the second end of the seventh rod; and the second frame member has a second end that is coupled to the second end of the eighth rod;

wherein the flexible container is supported by at least the second ends of the respective fifth, sixth, seventh, and eighth rods.

8. The foldable cart frame as claimed in claim 1, further comprising:

a first wheel coupled to the first end of the second rod; and
a second wheel coupled to the second end of the second rod.

9. The foldable cart as claimed in claim 7, comprising:

a first connector for coupling the first end of the first frame member to the second end of the fifth rod;

a second connector for coupling the second end of the first frame member to the second end of the sixth rod;

a third connector for coupling the first end of the second frame member to the second end of the seventh rod; and a fourth connector for coupling the second end of the second frame member to the second end of the eighth rod.

10. The foldable cart as claimed in claim 9, wherein the flexible container comprises an expandable base frame, wherein the expandable base frame comprises:

a first base frame member having a first end and a second end;

a second base frame member having a first end and a second end;

a first coupling assembly and a second coupling assembly, wherein:

the first coupling assembly comprises:

a first arm having a first end and a second end;

a second arm having a first end and a second end;

wherein the first end of the first arm is rotatably coupled to the first end of the first base frame member;

wherein the first end of the second arm is rotatably coupled to the first end of the second base frame member; and wherein the second end of the first arm is rotatably coupled to the second end of the second arm; and wherein:

the second coupling assembly comprises:

a first arm having a first end and a second end;

a second arm having a first end and a second end;

wherein the first end of the first arm is rotatably coupled to the second end of the first base frame member;

wherein the first end of the second arm is rotatably coupled to the second end of the second base frame member; and wherein the second end of the first arm is rotatably coupled to the second end of the second arm.

11. The foldable cart as claimed in claim 7, further comprising an extendable handle assembly rotatably coupled to the first rod.

12. The foldable cart as claimed in claim 11, wherein the extendable handle assembly comprises a telescoping handle comprised of at least two members.

13. The foldable cart as claimed in claim 11, including a retainer coupled to the second frame member of the flexible container for retaining the telescoping handle of the extendable handle assembly.

14. The foldable cart as claimed in claim 7, further comprising:

a first wheel coupled to the first end of the first rod; and
a second wheel coupled to the second end of the first rod.

15. The foldable cart frame as claimed in claim 7, further comprising:

a first wheel coupled to the first end of the second rod; and a second wheel coupled to the second end of the second rod.

16. A method of expanding a foldable cart frame as claimed in claim 1, wherein the method comprises the steps of:

rotating the third rod and the second rod away from each other and rotating the fifth rod and the first rod away from each other;

rotating the fourth rod and the second rod away from each other and rotating the sixth rod and the first rod away from each other; and rotating the third rod away and the fifth rod away from each other and rotating the fourth rod and the sixth rod away from each other.

17. The method of expanding a foldable cart frame as claimed in claim 16, wherein the method comprises the steps of:

rotating the third rod away from the second rod and rotating the fifth rod away from the first rod;

rotating the fourth rod away from the second rod and rotating the sixth rod away from the first rod; and rotating the third rod away from the fifth rod and rotating the fourth rod away from the sixth rod.

18. A method of folding a foldable cart frame as claimed in claim 1, wherein the method comprises the steps of:

rotating the third rod and the fifth rod towards each other and rotating the fourth rod and the sixth rod towards each other;

rotating the third rod and the second rod towards each other and rotating the fifth rod and the first rod towards each other; and rotating the fourth rod and the second rod towards each other and rotating the sixth rod and the first rod towards each other.

19. The method of folding a foldable cart frame as claimed in claim 18, wherein the method comprises the steps of:

rotating the third rod towards the fifth rod and rotating the fourth rod towards the sixth rod;

rotating the third rod towards the second rod and rotating the fifth rod towards the first rod; and rotating the fourth rod towards the second rod and rotating the sixth rod towards the first rod.

\* \* \* \* \*